(12) United States Patent
Park et al.

(10) Patent No.: US 8,805,063 B2
(45) Date of Patent: Aug. 12, 2014

(54) METHOD AND APPARATUS FOR DETECTING AND COMPENSATING FOR BACKLIGHT FRAME

(75) Inventors: Hyung-jun Park, Seongnam-si (KR);
Seong-wook Han, Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 72 days.

(21) Appl. No.: 13/337,364

(22) Filed: Dec. 27, 2011

(65) Prior Publication Data

US 2012/0328188 A1 Dec. 27, 2012

(30) Foreign Application Priority Data

Jun. 23, 2011 (KR) .................. 10-2011-0061424

(51) Int. Cl.
*G06K 9/00* (2006.01)
(52) U.S. Cl.
USPC ........... 382/162; 382/165; 382/168; 382/170; 382/254; 382/260
(58) Field of Classification Search
USPC ......... 382/162, 165, 168, 170, 172, 254, 274; 345/690, 617, 77
See application file for complete search history.

(56) References Cited

U.S. PATENT DOCUMENTS

| 2007/0182757 A1* | 8/2007 | Sankar et al. ................. 345/617 |
| 2007/0183678 A1* | 8/2007 | Sankar et al. ................. 382/254 |
| 2010/0007599 A1* | 1/2010 | Kerofsky ........................ 345/102 |
| 2011/0013048 A1* | 1/2011 | Wei et al. ....................... 348/234 |
| 2011/0058067 A1  | 3/2011 | Seo et al. |
| 2012/0007880 A1* | 1/2012 | Huang et al. .................. 345/617 |

FOREIGN PATENT DOCUMENTS

| JP | 6-86156 A | 3/1994 |
| KP | 10-2010-0020687 A | 2/2010 |
| KR | 10-2009-0019657 A | 2/2009 |
| KR | 10-2011-0025518 A | 3/2011 |

* cited by examiner

*Primary Examiner* — Ali Bayat
(74) *Attorney, Agent, or Firm* — Sughrue Mion, PLLC

(57) ABSTRACT

A method and apparatus for detecting and compensating for a backlight frame are provided. The method includes receiving data regarding a current frame comprising pixels that are expressed by a luminance component and one or more chrominance components; and determining whether the current frame is a backlight frame based on values of the one or more chrominance components of the pixels.

21 Claims, 6 Drawing Sheets

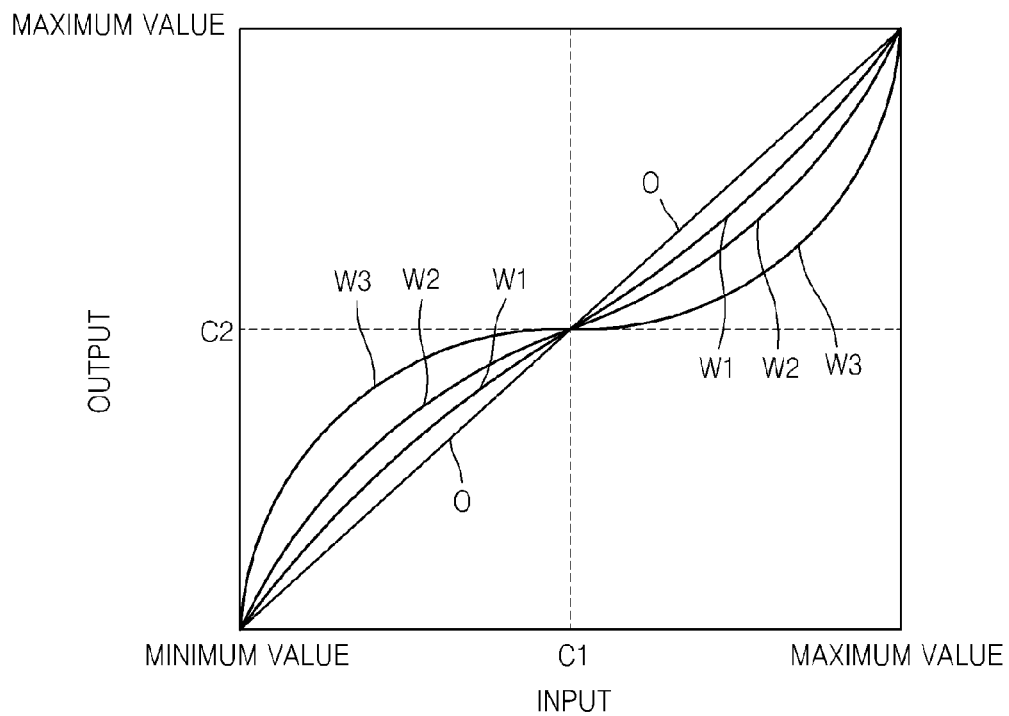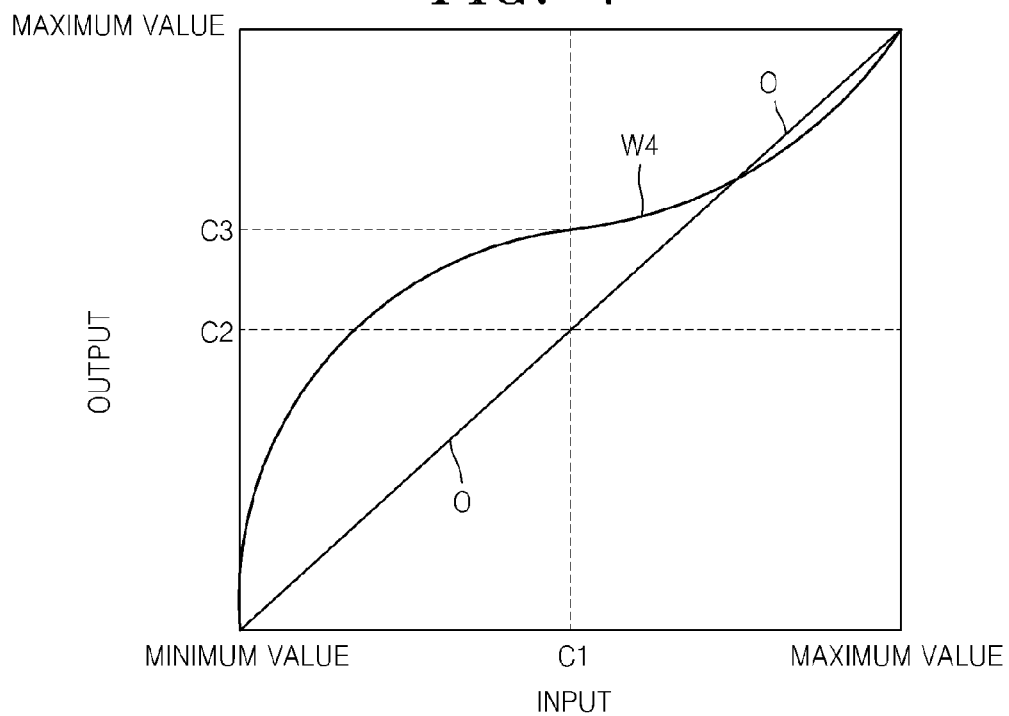

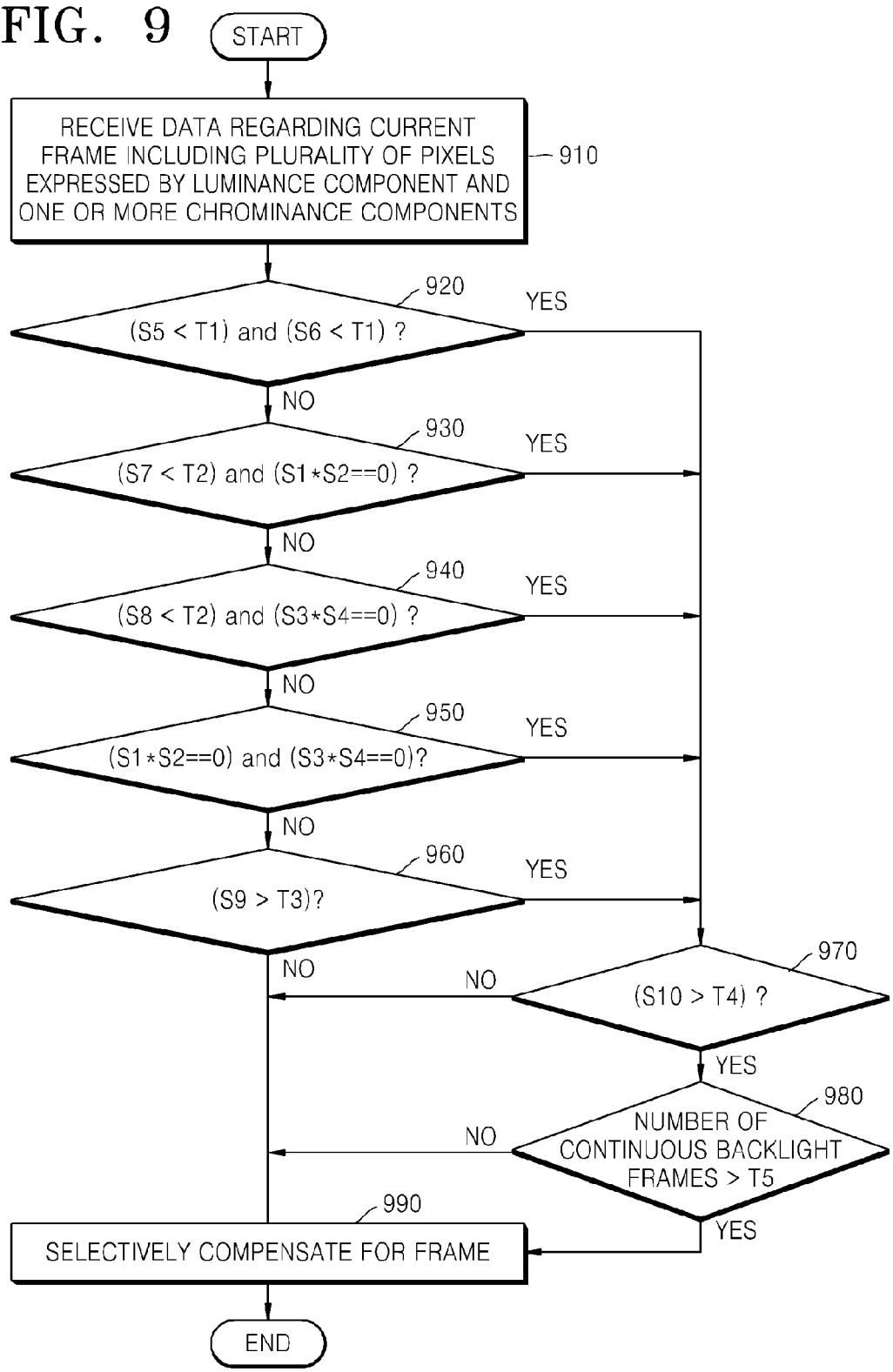

METHOD AND APPARATUS FOR DETECTING AND COMPENSATING FOR BACKLIGHT FRAME

CROSS-REFERENCE TO RELATED APPLICATION

This application claims priority from Korean Patent Application No. 10-2011-0061324, filed on Jun. 23, 2011 in the Korean Intellectual Property Office, the disclosure of which is incorporated by reference herein in its entirety.

BACKGROUND

1. Field

Apparatuses, methods, and computer program products consistent with the present disclosure relate to detecting and compensating for a backlight frame and, more particularly, to detecting a backlight frame from among continuous frames of a moving picture and compensating for the backlight frame.

2. Description of the Related Art

An image in which a light source is placed behind a target object is referred to as a backlight image. In the backlight image, it is possible to identify only a silhouette of the target object and it is not possible to identify details of the target object. As an exposure value is increased so as to improve the silhouette phenomenon, a luminance value of a background area excluding the target object becomes saturated, resulting in the background area being over-exposed and thus it is not possible to identify details of the background area.

SUMMARY

One or more exemplary embodiments provide a method and apparatus for detecting and compensating for a backlight frame.

One or more exemplary embodiments also provide a computer-readable recording medium having recorded thereon a program for executing the method.

According to an aspect of an exemplary embodiment, there is provided a method of detecting a frame, the method including receiving data regarding a current frame including pixels expressed by a luminance component and one or more chrominance components; and determining whether the current frame is a backlight frame based on values of the one or more chrominance components of the pixels.

According to an aspect of another exemplary embodiment, there is provided a apparatus for detecting and compensating for a backlight frame including a data processing unit that receives data regarding a current frame including pixels expressed by a luminance component and one or more chrominance components; and a backlight determining unit that determines whether the current frame is a backlight frame based on values of the one or more chrominance components of the pixels.

According to an aspect of another exemplary embodiment, there is provided a computer-readable recording medium having recorded thereon a program for executing the method.

BRIEF DESCRIPTION OF THE DRAWINGS

The above and other aspects will become more apparent by describing in detail exemplary embodiments with reference to the attached drawings in which:

FIG. 6 is a diagram describing a method of compensating for a backlight frame, according to another exemplary embodiment;

FIG. 7 is a diagram describing a method of compensating for a backlight frame, according to another exemplary embodiment;

FIG. 9 is a flowchart describing a method of compensating for a backlight frame, according to another exemplary embodiment.

DETAILED DESCRIPTION

Hereinafter, exemplary embodiments will be described in detail with reference to the attached drawings.

Figure 1:
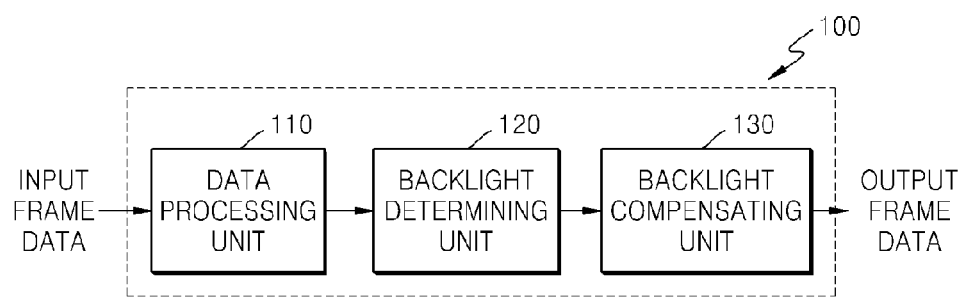
FIG. 1 illustrates a apparatus for detecting and compensating for a backlight frame according to an exemplary embodiment.

FIG. 1 illustrates an apparatus for detecting and compensating for a backlight frame 100 according to an exemplary embodiment.

Referring to FIG. 1, the apparatus 100 for detecting and compensating for a backlight frame includes a data processing unit 110, a backlight determining unit 120, and a backlight compensating unit 130. The term "unit" as used herein means a hardware component, such as a processor or circuit, and/or a software component that is executed by a hardware component such as a processor.

The data processing unit 110 receives data regarding a frame including a plurality of pixels. The data includes a luminance component and one or more chrominance components.

For image processing, a pixel value is expressed according to one of various color expressions including Red Green Blue (RGB), a Hue-Saturation-Brightness (HSB), CIE Lab, and YUV. YUV expresses a pixel value based on a luminance component and a chrominance component. According to YUV, one pixel may include a Y-component that denotes the luminance component, a Cb-component that denotes a blue-difference chrominance component, and a Cr-component that denotes a red-difference chrominance component.

As described above, in a backlight image, it is possible to identify only a silhouette of a target object and it is not possible to identify details of the target object and a background. Since a luminance of the background is significantly high, and a luminance of the target object is significantly low, it is difficult to identify the details of the target object and the background, and thus, there is a high possibility that values of luminance components of pixels included in the backlight frame approach a minimum value or a maximum value. By using a distribution characteristic of the luminance components, it is possible to detect the backlight frame.

However, the distribution characteristic of the luminance components, in which the values of the luminance components are distributed near the minimum value or the maximum value, is not a distribution characteristic that is only shown in the backlight frame, and thus, if another frame has both a highly bright area and a highly dim area, a distribution characteristic of luminance components which is the same as the backlight frame may be shown.

In other words, it is not possible to accurately detect the backlight frame by using only the distribution characteristic of the luminance components, and thus the apparatus for detecting and compensating for a backlight frame 100 detects the backlight frame in consideration of a distribution characteristic of chrominance components. For this, the data processing unit 110 receives data regarding a current frame including a plurality of pixels expressed by a luminance component and one or more chrominance components. If the data regarding the current frame does not include a plurality of pixels expressed by a luminance component and one or more chrominance components, the data processing unit 110 generates values of the luminance component and the one or more chrominance components by converting pixel values included in the data regarding the input current frame.

For example, if the data regarding the current frame which is input to the data processing unit 110 includes values of an R-component, a G-component, and a B-component of the pixels, it is possible to generate values of a Y-component, a Cb-component, and a Cr-component by converting the data by using a matrix as given by Equation 1 below.

$$\begin{bmatrix} Y \\ Cb \\ Cr \end{bmatrix} = \begin{bmatrix} 0.299000 & 0.587000 & 0.114000 \\ -0.168736 & -0.331264 & 0.500000 \\ 0.500000 & -0.418688 & -0.081312 \end{bmatrix} \begin{bmatrix} R \\ G \\ B \end{bmatrix}$$ [Equation 1]

The backlight determining unit 120 receives the data regarding the pixels expressed by the luminance component and the one or more chrominance components from the data processing unit 110, and determines whether the current frame is a backlight frame, based on the received data.

As described above, if the backlight frame is detected in consideration of only the distribution characteristic of the luminance components, accuracy of the detection may deteriorate. Thus, the backlight determining unit 120 may determine whether the current frame is the backlight frame, based on distribution of the values of the one or more chrominance components.

Since the distribution of the one or more chrominance components in the backlight frame is different from the distribution of chrominance components in a non-backlight frame, and details of a target object and a background are not identified in the backlight frame, there is thus a high possibility that the values of the one or more chrominance components may be values near '0'. This is because values of chrominance signals have values near '0' since colors of the details of the target object and the background are not normally expressed in the backlight frame. This will now be described in detail with reference to FIGS. 2A and 2B.

Figure 2A:
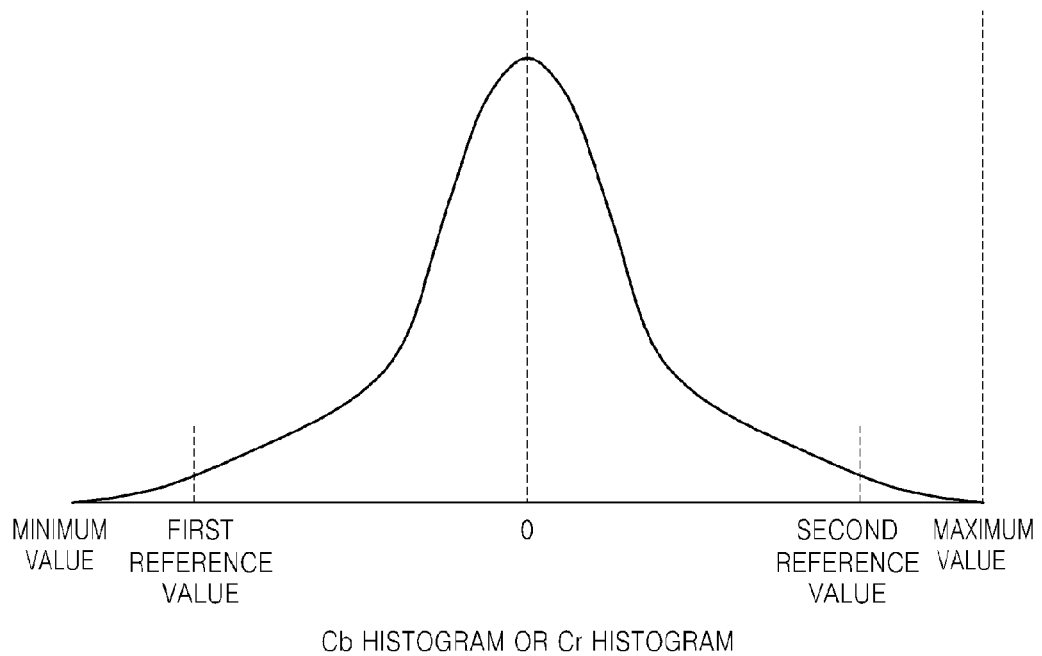
FIG. 2A illustrates a histogram of a chrominance component, according to an exemplary embodiment.

FIG. 2A illustrates a histogram of a chrominance component, according to an exemplary embodiment.

Referring to FIG. 2A, the chrominance component may be at least one of a Cb-component and a Cr-component. If it is assumed that values of the Cb-component and values of the Cr-component are expressed in an 8-bit manner, the values of the Cb-component and the values of the Cr-component may be between about −127 and about +128 or between about −128 and about +127. The value of −127 or −128 is an available minimum value with respect to a value of the chrominance component, and the value of +128 or +127 is an available maximum value with respect to the value of the chrominance component. This is only an example and the chrominance component may be expressed using any number of bits.

As illustrated in FIG. 2A, there is a high possibility that the values of the chrominance component of pixels included in a backlight frame are near '0'. If values of a Cb-component or values of a Cr-component of pixels included in a current frame are shown via a histogram, there is a high possibility that the values of the Cb-component or the values of the Cr-component are mostly distributed in a range near '0' and are not distributed in a range near the minimum value or the maximum value.

Thus, the backlight determining unit 120 may determine whether the current frame is a backlight frame, based on distribution of values of a first chrominance component (e.g., the Cb-component) and values of a second chrominance component (e.g., the Cr-component). Based on a first reference value and a second reference value of FIG. 2A which may be determined experimentally, the backlight determining unit 120 may determine whether the values of the first chrominance component and the values of the second chrominance component are distributed in a range near '0', and if the values of the first chrominance component and the values of the second chrominance component are mostly distributed in the range near '0', the backlight determining unit 120 may determine that the current frame is the backlight frame.

Also, the backlight determining unit 120 may use the values of the luminance component so as to detect the backlight frame. In order to detect the backlight frame, the backlight determining unit 120 may use not only the values of the one or more chrominance components but may also use the values of the luminance component.

Figure 2B:
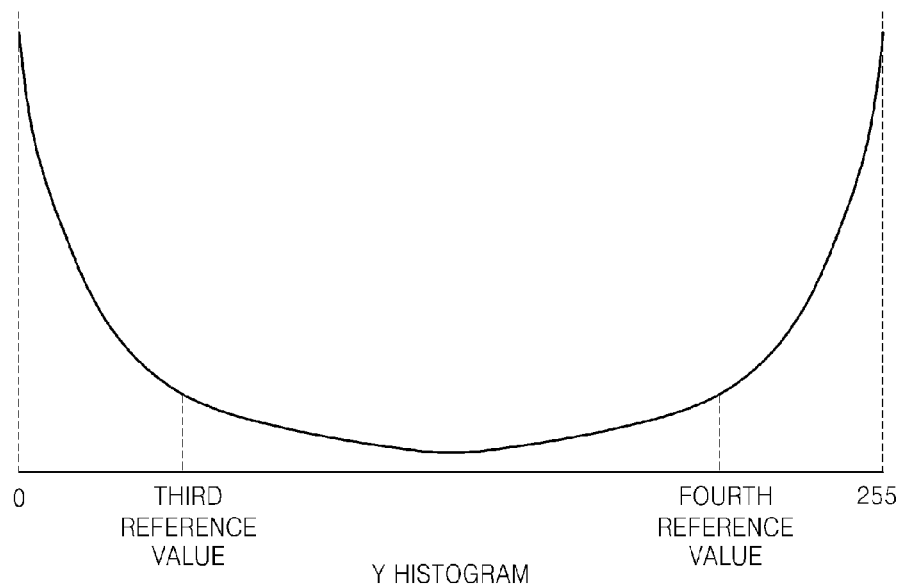
FIG. 2B illustrates a histogram of a luminance component, according to an exemplary embodiment.

FIG. 2B illustrates a histogram of a luminance component, according to an exemplary embodiment.

Referring to FIG. 2B, the luminance component may be a Y-component. If it is assumed that values of the Y-component are expressed in an 8-bit manner, the values of the Y-component may be between about 0 and about +255. The value of 0 is an available minimum value with respect to a value of the Y-component, and the value of +255 is an available maximum value with respect to the value of the Y-component. This is only an example, and the luminance component may alternatively be expressed with any number of bits.

As illustrated in FIG. 2B, there is a high possibility that the values of the luminance component of pixels included in a backlight frame are near the minimum value or the maximum value. If values of a Y-component of pixels included in a current frame are shown via a histogram, the values of the Y-component are mostly distributed in a range near the minimum value and in a range near the maximum value.

Thus, the backlight determining unit 120 may determine whether the current frame is a backlight frame, based on distribution of values of the luminance component (e.g., the Y-component). Based on a third reference value and a fourth reference value of FIG. 2B which may be determined experimentally, the backlight determining unit 120 may determine whether the values of the luminance component are mostly distributed in the range near the minimum value or in the range near the maximum value, and if the values of the luminance component are mostly distributed in the range near the minimum value or in the range near the maximum value, the backlight determining unit 120 may accordingly determine whether the current frame is the backlight frame.

The backlight determining unit 120 may determine whether the current frame is the backlight frame by referring to only the values of the one or more chrominance components, or may determine whether the current frame is the backlight frame by referring to not only the values of the one or more chrominance components but also by referring to the values of the luminance component.

When the backlight determining unit 120 also refers to the values of the luminance component, an order of references may vary. The backlight determining unit 120 may determine whether the current frame is the backlight frame by first referring to the values of the one or more chrominance components, and then may determine whether the current frame is the backlight frame by referring to the values of the luminance component. Conversely, the backlight determining unit 120 may determine whether the current frame is the backlight frame by first referring to the values of the luminance component, and then may determine whether the current frame is the backlight frame by referring to the values of the one or more chrominance components.

A method by which the backlight determining unit 120 determines whether the current frame is the backlight frame based on the distribution of the luminance component, the values of the first chrominance component, and the values of the second chrominance component will be described in detail later with reference to FIG. 9.

Referring back to FIG. 1, the backlight compensating unit 130 compensates for the current frame that is determined as the backlight frame by the backlight determining unit 120. The backlight compensating unit 130 compensates for the values of the luminance component and the values of the one or more chrominance components of the current frame. Alternatively, the backlight compensating unit 130 may compensate for only the values of the luminance component or may compensate for only the values of the one or more chrominance components.

The backlight compensating unit 130 may compensate for the current frame only when a plurality of continuous frames prior to the current frame are determined as backlight frames. In a case of a frame included in a moving picture, if the frame determined as a backlight frame is immediately compensated for, unintended flickering may occur. This will now be described in detail with reference to FIG. 3.

Figure 3:
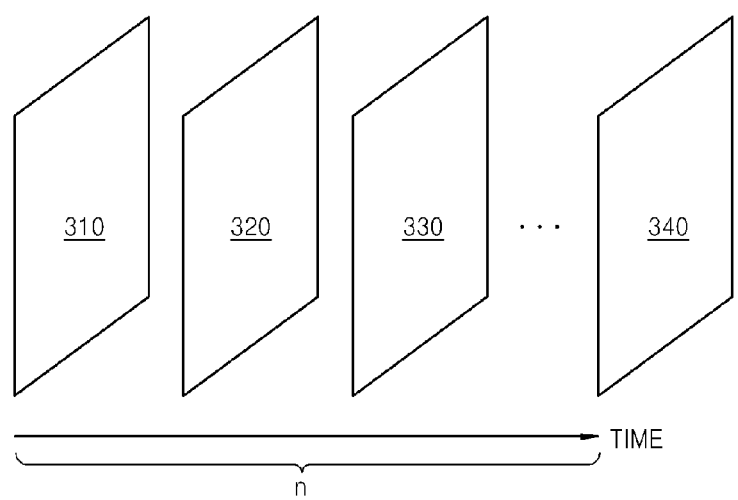
FIG. 3 illustrates continuous frames, according to an exemplary embodiment.

FIG. 3 illustrates continuous frames, according to an exemplary embodiment.

Regarding the continuous frames of FIG. 3, it is assumed that this is a case in which the backlight determining unit 120 determines a first frame 310 as a backlight frame, determines a second frame 320 as a non-backlight frame, and determines a third frame 330 as a backlight frame.

If a frame determined as a backlight frame is immediately compensated for, only the first frame 310 and the third frame 330 are compensated for, and the second frame 320 is not compensated for. However, there is a high possibility that the continuous frames relate to the same scene, and thus the continuous frames may relate to the same target object and background. However, if the second frame 320 is not compensated for because the second frame 320 has been determined as the non-backlight frame, unintended flickering occurs between the first frame 310 and the third frame 330.

Thus, the backlight compensating unit 130 compensates for a current frame 340 only when the number of continuous frames that were determined as backlight frames prior to the current frame 340 is equal to or greater than a threshold number. For example, as shown in FIG. 3, although the backlight determining unit 120 determines the current frame 340 as a backlight frame, the backlight compensating unit 130 compensates for the current frame 340 only when all of n-1 frames (i.e., the first through third frames 310 through 330) prior to the current frame 340 have been determined as the backlight frames. In this manner, by compensating for the current frame 340 only when frames (i.e., the first through third frames 310 through 330) prior to compensation of the current frame 340 have been determined as the backlight frames, the occurrence of the flickering due to repetition of compensation and non-compensation of the frames is decreased.

Referring back to FIG. 1, the backlight compensating unit 130 may compensate for the values of the luminance component by multiplying different weights according to the values by the values of the luminance component. Also, similarly, the backlight compensating unit 130 may compensate for the values of the one or more chrominance components by multiplying different weights according to the values by the values of the one or more chrominance components. The backlight compensating unit 130 may compensate for only the values of the luminance component or may compensate for only the values of the one or more chrominance components.

Figure 4:
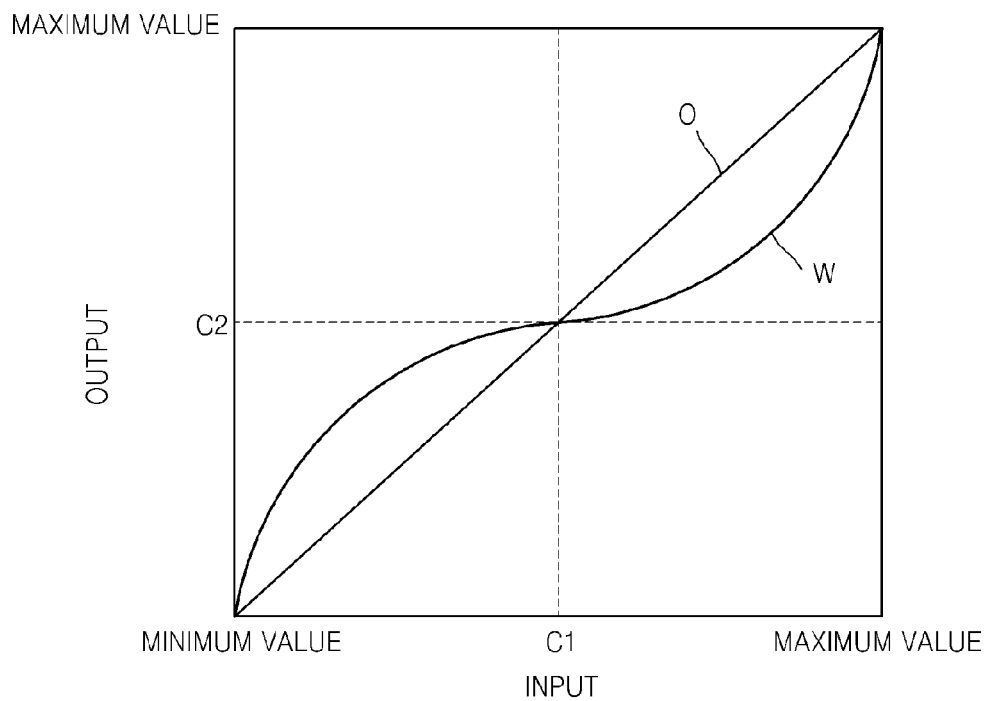
FIG. 4 is a diagram describing a method of compensating for a backlight frame, according to an exemplary embodiment.

FIG. 4 is a diagram describing a method of compensating for a backlight frame, according to an exemplary embodiment.

A horizontal axis of FIG. 4 is an axis with respect to a luminance component that is input to the backlight compensating unit 130, and a vertical axis of FIG. 4 is an axis with respect to a luminance component that is compensated for by the backlight compensating unit 130 and then is output. When a value of the luminance component is expressed in an 8-bit manner, a maximum value may be 255 and a minimum value may be 0. A line O of FIG. 4 indicates a correspondence relation between the input luminance component and the output luminance component when compensation is not performed, and in this regard, the backlight compensating unit 130 changes the correspondence relation between the input luminance component and the output luminance component by changing the line O to a line W, so that the backlight compensating unit 130 compensates for the value of the luminance component.

Referring to the line W of FIG. 4, the backlight compensating unit 130 determines a value of the output luminance component by multiplying different weights according to the value of the output luminance component by a value of the input luminance component. The backlight compensating unit 130 compensates for the value of the input luminance component based on a sigmoid curve as the line W of FIG. 4, and then determines the value of the output luminance component.

If the value of the input luminance component is greater than C1, the backlight compensating unit 130 determines the value of the output luminance component by multiplying a weight less than 1 by the value of the input luminance component. Conversely, if the value of the input luminance component is less than C1, the backlight compensating unit 130 determines the value of the output luminance component by multiplying a weight greater than 1 by the value of the input luminance component. The backlight compensating unit 130 compensates for a small value of the luminance component to a larger value by multiplying a weight greater than 1 by the small value, and compensates for a large value of the luminance component to a smaller value by multiplying a weight less than 1 by the large value.

Figure 5:
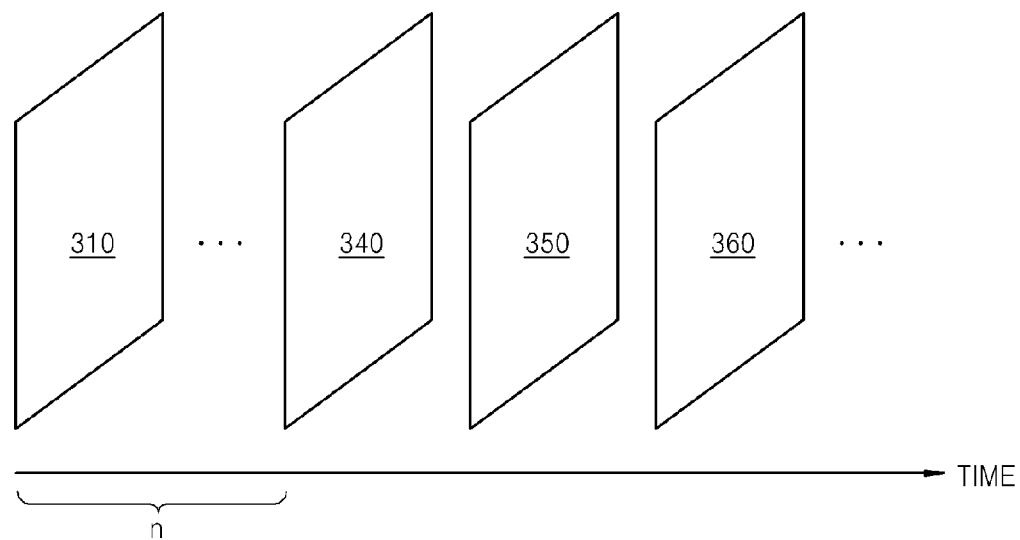
FIG. 5 illustrates continuous frames, according to another exemplary embodiment.

FIG. 5 illustrates continuous frames, according to another exemplary embodiment.

In a case where continuous frames 310 through 360 of FIG. 5 are all backlight frames, as illustrated in FIG. 3, a current frame 340 is first compensated for. Thus, the frames 310 through 330 prior to the current frame 340 are not compensated for, and the frames 350 and 360 after the current frame 340 are compensated for. Here, since the frame 330 just prior to the current frame 340 is not compensated for whereas the current frame 340 is compensated for, flickering may occur between the frame 330 and the current frame 340.

In order to minimize the occurrence of flickering, the backlight compensating unit 130 may stepwise increase or decrease a weight that is multiplied by a value of an input luminance component for compensation. A weight that is multiplied by the value of the luminance component based on the line W of FIG. 4 may stepwise increase or decrease by a predetermined amount, when continuous frames are determined as backlight frames. This will now be described in detail with reference to FIG. 6.

FIG. 6 is a diagram describing a method of compensating for a backlight frame, according to another exemplary embodiment.

Referring to FIG. 6, backlight of the current frame 340 may be compensated for based on a line W1, backlight of the next frame 350 may be compensated for based on a line W2, and backlight of the last frame 360 may be compensated for based on a line W3.

Comparing the lines W1, W2, and W3, if a value of an input luminance component is greater than C1, a weight stepwise decreases due to a change from the line W1 to the line W3, and if the value of the input luminance component is less than C1, the weight stepwise increases due to a change from the line W1 to the line W3.

By stepwise increasing a level of backlight compensation according to the lines W1, W2, and W3, the change becomes more gradual and flickering between the current frame 340 and the previous frames 310 through 330 is minimized. In a case where frames after the last frame 360 are also backlight frames, the after-frames may be compensated for by increasing a level of compensation, compared to the level of compensation according to the line W3, or the after-frames may be compensated for by using a level of compensation which is the same as the level of compensation according to the line W3.

FIG. 7 is a diagram describing a method of compensating for a backlight frame, according to another exemplary embodiment.

Referring to FIG. 7, the backlight compensating unit 130 may compensate for a current frame by changing an inflection point according to C1 and C2 of FIG. 4. By moving the inflection point by using a change from C2 to C3, the current frame may be compensated for. A correspondence relation between a value of an input luminance component and a value of an output luminance component according to a result of the change from C2 to C3 is applied to a line W4. Comparing FIG. 4 and FIG. 7, according to the change from C2 to C3, values of the output luminance component are wholly increased so that the current frame that is a backlight frame may be compensated for to be a brighter screen, compared to a case of FIG. 4.

FIGS. 4 through 7 correspond to a case in which the values of the luminance component are compensated for. However, similar to the case of FIGS. 4 through 7, values of a chrominance component may be compensated for by being multiplied by different weights according to the values by the values of the chrominance component. In the backlight frame, the values of the chrominance component are distributed in a range near '0', so that the values of the chrominance component may be compensated for in such a manner that small values from among values of an input chrominance component are compensated for by being multiplied by a weight greater than 1, and large values from among the values of the input chrominance component are compensated for by being multiplied by a weight less than the weight that is multiplied by the small values.

Referring back to FIG. 1, the backlight compensating unit 130 compensates for an input frame, and outputs data regarding a compensated frame. The output data may be transmitted to a display module (not shown), and the compensated frame may be displayed by the display module. Also, the output data may be stored in a predetermined storage device.

Figure 8:
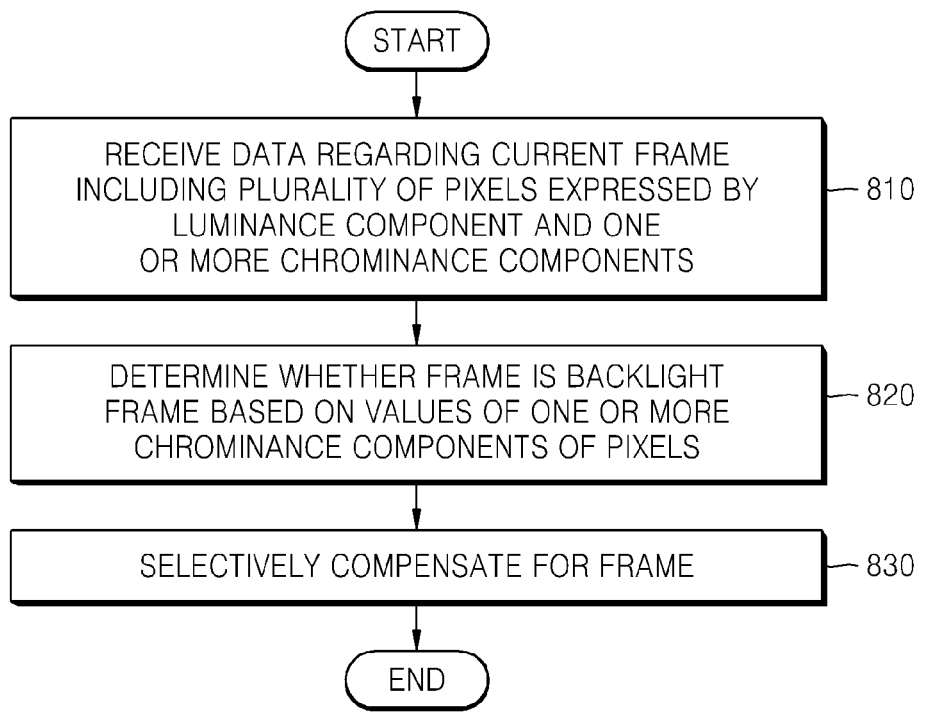
FIG. 8 is a diagram describing a method of compensating for a backlight frame, according to another exemplary embodiment.

FIG. 8 is a diagram describing a method of compensating for a backlight frame, according to another exemplary embodiment.

Referring to FIG. 8, in operation 810, the apparatus 100 for detecting and compensating for a backlight frame receives data regarding a current frame including a plurality of pixels expressed by a luminance component and one or more chrominance components. The one or more chrominance components may include a first chrominance component (e.g., a Cb-component) or a second chrominance component (e.g., a Cr-component).

If the data regarding the current frame does not include the plurality of pixels expressed by the luminance component and the one or more chrominance components, the apparatus 100 for detecting and compensating for a backlight frame generates values of the luminance component and the one or more chrominance components by converting pixel values included in the data regarding the input current frame.

In operation 820, the apparatus 100 for detecting and compensating for a backlight frame determines whether the current frame is a backlight frame, based on the values of the one or more chrominance components included in the data received in operation 810. The apparatus 100 for detecting and compensating for a backlight frame may determine whether the current frame is the backlight frame, based on a distribution of values of the first chrominance component (e.g., the Cb-component) or a distribution of values of the second chrominance component (e.g., the Cr-component). When the values of the one or more chrominance components are distributed in a range near '0', the apparatus 100 for detecting and compensating for a backlight frame may determine that the current frame is the backlight frame. In order to determine whether the current frame is the backlight frame, the apparatus 100 for detecting and compensating for a backlight frame may use not only the values of the one or more chrominance components but may also use the values of the luminance component.

In operation 830, the apparatus 100 for detecting and compensating for a backlight frame selectively compensates for the current frame based on a result of the determination in operation 820. If the current frame is determined as the backlight frame in operation 820, the apparatus 100 for detecting and compensating for a backlight frame compensates for the current frame based on the method described above with reference to FIGS. 4 through 7.

Data regarding the current frame compensated for in operation 830 may be transmitted to a display module, and the display module may display the compensated current frame. Also, the data regarding the compensated current frame may be stored in a storage device.

FIG. 9 is a flowchart describing a method of compensating for a backlight frame, according to another exemplary embodiment.

Referring to FIG. 9, in operation 910, the apparatus 100 for detecting and compensating for a backlight frame receives data regarding a current frame including a plurality of pixels configured of a luminance component and one or more chrominance components. Operation 910 corresponds to operation 810 of the method in FIG. 8.

Hereinafter, operations 920 through 970 are performed to determine whether the current frame is a backlight frame. For convenience of description regarding operations 920 through 970, variables are defined in Equations 2 and 3.

[Equation 2]

S1=the number of values of a first chrominance component between a minimum value and a first reference value S2=the number of values of the first chrominance component between a maximum value and a second reference value S3=the number of values of a second chrominance component between the minimum value and the first reference value S4=the number of values of the second chrominance component between the maximum value and the second reference value

S5=S1+S4

S6=S2+S3

S7=S1+S2

S8=S3+S4

In Equation 2, the first chrominance component may be a Cb-component, and the second chrominance component may be a Cr-component. Also, the minimum value, the maximum value, the first reference value, and the second reference value correspond to the minimum value, the maximum value, the first reference value, and the second reference value illustrated in FIG. 2A.

[Equation 3]

S9=the number of values of a luminance component between a minimum value and a third reference value S10=the number of values of the luminance component between a maximum value and a fourth reference value In Equation 3, the minimum value, the maximum value, the third reference value, and the fourth reference value respectively correspond to the minimum value, the maximum value, the third reference value, and the fourth reference value illustrated in FIG. 2B.

In operation 920, the apparatus 100 for detecting and compensating for a backlight frame determines whether S5 is less than a first threshold value T1, and whether S6 is less than the first threshold value T1. As described above, if the current frame is the backlight frame, values of the one or more chrominance components are distributed in a range near '0', as illustrated in FIG. 2A. Also, in order to further accurately determine whether the current frame is the backlight frame, the values of the first chrominance component, and the values of the second chrominance component are considered simultaneously.

Thus, if the apparatus 100 for detecting and compensating for a backlight frame determines whether the values of the one or more chrominance components are distributed in the range near '0', based on S5 and S6 that are combinations of the number of values of the first chrominance component and the number of values of the second chrominance component, respectively, an accuracy of the determination may be improved. For this purpose, in operation 920, the apparatus 100 for detecting and compensating for a backlight frame determines whether S5 and S6 are less than the first threshold value T1.

In operation 920, if the current frame is determined as the backlight frame because S5 and S6 are less than the first threshold value T1 (YES in operation 920), in operation 970, whether the current frame is the backlight frame is determined again. In operation 920, if the current frame is determined as a non-backlight frame because S5 or S6 is equal to or greater than the first threshold value T1 (NO in operation 920), operation 930 is performed.

In operation 930, the apparatus 100 for detecting and compensating for a backlight frame determines whether S7 is less than a second threshold value T2 and whether at least one of S1 and S2 is equal to 0. In operation 920, whether the current frame is the backlight frame is determined by combining the number of the values of the first chrominance component and the number of the values of the second chrominance component, and in operation 930, whether the current frame is the backlight frame is determined by referring to only the values of the first chrominance component. Thus, the apparatus 100 for detecting and compensating for a backlight frame performs operation 930 by referring to S7, S1 and S2 that are unrelated to the values of the second chrominance component.

In operation 930, if the current frame is determined as the backlight frame because S7 is less than the second threshold value T2 and at least one of S1 and S2 is equal to 0 (YES in operation 930), in operation 970, whether the current frame is the backlight frame is determined again. In operation 930, if the current frame is determined as a non-backlight frame because S7 is equal to or greater than the second threshold value T2 or both S1 and S2 are not 0 (NO in operation 930), operation 940 is performed.

In operation 940, the apparatus 100 for detecting and compensating for a backlight frame determines whether S8 is less than the second threshold value T2 and whether at least one of S3 and S4 is equal to 0. In operation 920, whether the current frame is the backlight frame is determined by combining the number of the values of the first chrominance component and the number of the values of the second chrominance component, and in operation 930, whether the current frame is the backlight frame is determined by referring to only the values of the first chrominance component. Thus, in operation 940, whether the current frame is the backlight frame is determined by referring to only the values of the second chrominance component. Thus, the apparatus 100 for detecting and compensating for a backlight frame performs operation 940 by referring to S8, S3 and S4 that are unrelated to the values of the first chrominance component.

In operation 940, if the current frame is determined as the backlight frame because S8 is less than the second threshold value T2 and if at least one of the S3 and S4 is equal to 0 (YES in operation 940), in operation 970, whether the current frame is the backlight frame is determined again. In operation 940, if the current frame is determined as a non-backlight frame because S8 is equal to or greater than the second threshold value T2 or both S3 and S4 are not 0 (NO in operation 940), the apparatus 100 for detecting and compensating for a backlight frame performs operation 950.

In operation 950, the apparatus for detecting and compensating for a backlight frame 100 determines whether at least one of S1 and S2 is equal to 0 and whether at least one of S3 and S4 is equal to 0. If at least one of S1 and S2 is equal to 0, the apparatus for detecting and compensating for a backlight frame 100 may determine that the values of the first chrominance component are distributed in the range near '0', and if at least one of S3 and S4 is equal to 0, the apparatus for detecting and compensating for a backlight frame 100 may determine that the values of the second chrominance component are distributed in the range near '0'. Thus, in operation 950, the apparatus 100 for detecting and compensating for a backlight frame determines whether the current frame is the backlight frame, based on S1, S2, S3, and S4.

In operation 950, if the apparatus for detecting and compensating for a backlight frame 100 determines that the current frame is the backlight frame because at least one of S1 and S2 is equal to 0 and at least one of S3 and S4 is equal to 0 (YES in operation 950), in operation 970, the apparatus 100 for detecting and compensating for a backlight frame determines again whether the current frame is the backlight frame. In operation 950, if the apparatus for detecting and compensating for a backlight frame 100 determines that the current frame is a non-backlight frame because both S1 and S2 are not equal to 0 or both S3 and S4 are not equal to 0 (NO in operation 950), the apparatus 100 for detecting and compensating for a backlight frame performs operation 960.

In operation 960, the apparatus 100 for detecting and compensating for a backlight frame determines whether S9 is greater than a third threshold value T3. In operation 961, the apparatus 100 for detecting and compensating for a backlight frame determines whether the current frame is the backlight frame by referring to the values of the luminance component. Thus, the apparatus 100 for detecting and compensating for a backlight frame determines whether the number of values of the luminance component between the minimum value and the third reference value is greater than the third threshold value T3. If the number of values of the luminance component is equal to or less than the third threshold value T3, the apparatus 100 for detecting and compensating for a backlight frame determines that the current frame is a non-backlight frame, and performs operation 990. However, the apparatus for detecting and compensating for a backlight frame 100 determines that the current frame is the backlight frame because the number of values of the luminance component is greater than the third threshold value T3, the apparatus 100 for detecting and compensating for a backlight frame determines again whether the current frame is the backlight frame in operation 970.

In operation 970, the apparatus 100 for detecting and compensating for a backlight frame determines whether S10 is greater than a fourth threshold value T4. Similar to operation 960, in operation 970, the apparatus 100 for detecting and compensating for a backlight frame determines whether the current frame is the backlight frame by referring to the values of the luminance component. The apparatus 100 for detecting and compensating for a backlight frame determines whether the number of the values of the luminance component between the maximum value and the fourth reference value is greater than the fourth threshold value T4. If S10 is greater than the fourth threshold value T4, the apparatus 100 for detecting and compensating for a backlight frame determines that the current frame is the backlight frame, and performs operation 980. If S10 is equal to or less than the fourth threshold value T4, the apparatus 100 for detecting and compensating for a backlight frame determines that the current frame is a non-backlight frame, and performs operation 990.

In operation 980, the apparatus 100 for detecting and compensating for a backlight frame determines whether the number of continuous frames having been determined as backlight frames is greater than a fifth threshold value T5. That is, the apparatus 100 for detecting and compensating for a backlight frame determines whether the number of continuous backlight frames prior to the current frame is greater than the fifth threshold value T5. Operation 980 is performed to determine whether or not to compensate for the current frame, and although the current frame is determined as the backlight frame via operations 920 through 970, if the number of continuous backlight frames prior to the current frame is less than or equal to the fifth threshold value T5, the apparatus 100 for detecting and compensating for a backlight frame does not compensate for the current frame in operation 990.

In operation 990, the apparatus 100 for detecting and compensating for a backlight frame selectively compensates for the current frame. Via operations 920 through 970, if the current frame is determined as a non-backlight frame, the apparatus 100 for detecting and compensating for a backlight frame does not compensate for the current frame. In addition, although the current frame is determined as the backlight frame via operations 920 through 970, if the apparatus for detecting and compensating for a backlight frame 100 determines that the number of continuous backlight frames prior to the current frame is less than or equal to the fifth threshold value T5 in operation 980, the apparatus 100 for detecting and compensating for a backlight frame does not compensate for the current frame. However, via operations 920 through 970, if the apparatus 100 for detecting and compensating for a backlight frame determines that the current frame is the backlight frame and determines that the number of continuous backlight frames prior to the current frame is greater than the fifth threshold value T5, the apparatus 100 for detecting and compensating for a backlight frame compensates for the current frame. The method of compensating for the backlight frame is described above with reference to FIGS. 4 through 7. Data regarding the current frame compensated for in operation 990 may be transmitted to a display module, and the compensated current frame may be displayed by the display module. Also, the data regarding the compensated current frame may be stored in a storage device.

Operations 920 through 970 of FIG. 9 are performed to determine whether the current frame is the backlight frame, and it is not necessary to perform operations 920 through 970 together. In order to determine whether the current frame is the backlight frame, operations 920 through 970 may be independently performed. For example, only operation 920 may be performed to determine whether the current frame is the backlight frame, and operations 930 through 970 may not be performed.

Also, whether the current frame is the backlight frame may be determined by combining some of aforementioned operations. For example, it is possible to determine whether the current frame is the backlight frame by performing only operations 920, 930, 940, and 950 without performing operations 960 and 970.

According to the one or more exemplary embodiments, a compensation error according to a detection error may be prevented by accurately detecting a backlight frame. Also, it is possible to compensate for the backlight frame while a compensation error such as flickering, which may be apparent to a user during compensation of the backlight frame, is minimized, so that user's satisfaction may be improved.

While the present inventive concept has been particularly shown and described with reference to exemplary embodiments thereof, it will be understood by those of ordinary skill in the art that various changes in form and details may be made therein without departing from the spirit and scope of the present invention as defined by the following claims. Also, the present inventive concept can also be embodied as computer readable codes on a computer readable recording medium.

For example, the apparatus for detecting and compensating for a backlight frame of FIG. 1 may include a bus coupled to each unit and at least one processor coupled to the bus. Also, the apparatus for detecting and compensating for a backlight frame according to the one or more exemplary embodiments may include a memory coupled to the at least one processor that is coupled to the bus so as to store commands, received messages, or generated messages, and to execute the commands.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

What is claimed is:

1. A method of detecting a frame, the method comprising:
receiving data regarding a current frame comprising pixels that are expressed by a luminance component and one or more chrominance components; and
determining whether the current frame is a backlight frame based on values of the one or more chrominance components of the pixels,
wherein the determining comprises determining whether the current frame is the backlight frame based on a distribution of the values of the one or more chrominance components.

2. The method of claim 1, wherein the one or more chrominance components comprise a first chrominance component and a second chrominance component, and
wherein the determining comprises determining whether the current frame is the backlight frame based on the distribution of values of the first chrominance component and the distribution of values of the second chrominance component.

3. The method of claim 2, wherein the first chrominance component is a blue-difference chrominance component, and the second chrominance component is a red-difference chrominance component.

4. The method of claim 3, wherein the determining comprises determining whether the current frame is the backlight frame based on a number of the values of the first chrominance component between a minimum value and a first reference value, a number of the values of the second chrominance component between the minimum value and the first reference value, a number of the values of the first chrominance component between a maximum value and a second reference value, and a number of the values of the second chrominance component between the maximum value and the second reference value, and
wherein the minimum value and the maximum value are an available minimum value and an available maximum value of the values of the first chrominance component and the values of the second chrominance component.

5. The method of claim 4, wherein the determining comprises:
(a) determining the current frame as the backlight frame if a total sum of the number of the values of the first chrominance component between the minimum value the first reference value and the number of the values of the second chrominance component between the maximum value and the second reference value is less than a first threshold value, and a total sum of the number of the values of the first chrominance component between the maximum value and the second reference value and the number of the values of the second chrominance component between the minimum value and the first reference value is less than the first threshold value.

6. The method of claim 5, wherein the determining further comprises:
(b), as a result of the determining (a), when the current frame is a non-backlight frame, determining the current frame as the backlight frame if a total sum of the number of the values of the first chrominance component between the minimum value and the first reference value and the number of the values of the first chrominance component between the maximum value and the second reference value is less than a second threshold value, and if the number of the values of the first chrominance component between the minimum value and the first reference value is equal to 0 or the number of the values of the first chrominance component between the maximum value and the second reference value is equal to 0.

7. The method of claim 6, wherein the determining further comprises:
(c), as a result of the determining (b), when the current frame is a non-backlight frame, determining the current frame as the backlight frame if a total sum of the number of the values of the second chrominance component between the minimum value and the first reference value and the number of the values of the second chrominance component between the maximum value and the second reference value is less than the second threshold value, and if the number of the values of the second chrominance component between the minimum value and the first reference value is equal to 0 or the number of the values of the second chrominance component between the maximum value and the second reference value is equal to 0.

8. The method of claim 7, wherein the determining further comprises:
(d), as a result of the determining (c), when the current frame is a non-backlight frame, determining the current frame as the backlight frame if the number of the values of the first chrominance component between the minimum value and the first reference value is equal to 0 or the number of the values of the first chrominance component between the maximum value and the second reference value is equal to 0, and if the number of the values of the second chrominance component between the minimum value and the first reference value is equal to 0 or the number of the values of the second chrominance component between the maximum value and the second reference value is equal to 0.

9. The method of claim 8, wherein the determining further comprises:
(e), as a result of the determining (d), when the current frame is a non-backlight frame, determining the current frame as the backlight frame if a number of values of the luminance component between the minimum value and a third reference value is greater than a third threshold value.

10. The method of claim 9, wherein the determining further comprises:
when the current frame is determined as the backlight frame via one of the determining (a), the determining (b), the determining (c), the determining (d), and the determining (e), determining the current frame as the backlight frame if a number of the values of the luminance component between the maximum value and a fourth reference value is greater than a fourth threshold value.

11. The method of claim 2, further comprising:
determining whether a number of frames including the current frame and continuous frames prior to the current frame is greater than a fifth threshold value, wherein the continuous frames have been determined as backlight frames; and if it is determined that the number of frames is greater than the fifth threshold value, compensating for the current frame.

12. The method of claim 11, wherein the compensating of the current frame comprises multiplying different weights by the values of the luminance component according to the values of the luminance component.

13. The method of claim 12, wherein the different weights stepwise increase or decrease by a predetermined amount, according to whether continuous frames after the current frame are determined as backlight frames.

14. The method of claim 11, wherein the compensating of the current frame comprises multiplying different weights according to the values of the first chrominance component or according to the values of the second chrominance component.

15. A non-transitory computer-readable recording medium having recorded thereon a program for executing the method of claim 1.

16. An apparatus for detecting and compensating for a backlight frame, the apparatus comprising:
   a data processing unit that receives data regarding a current frame comprising pixels that are expressed by a luminance component and one or more chrominance components; and
   a backlight determining unit that determines whether the current frame is a backlight frame based on values of the one or more chrominance components of the pixels,
   wherein the backlight determining unit determines whether the current frame is the backlight frame based on distribution of the values of the one or more chrominance components.

17. The apparatus for detecting and compensating for a backlight frame of claim 16, wherein the one or more chrominance components comprise a first chrominance component and a second chrominance component, and
   wherein the backlight determining unit determines whether the current frame is the backlight frame based on a distribution of values of the first chrominance component and a distribution of values of the second chrominance component.

18. The apparatus for detecting and compensating for a backlight frame of claim 17, further comprising a backlight compensating unit that determines whether a number of frames including the current frame and continuous frames prior to the current frame is greater than a fifth threshold value, wherein the continuous frames have been determined as backlight frames, and compensates for the current frame if it is determined that the number of frames is greater than the fifth threshold value.

19. The apparatus for detecting and compensating for a backlight frame of claim 18, wherein the backlight compensating unit multiplies different weights by values of the luminance component according to the values of the luminance component.

20. The apparatus for detecting and compensating for a backlight frame of claim 19, wherein the different weights stepwise increase or decrease by a predetermined amount, according to whether continuous frames after the current frame are determined as backlight frames.

21. The apparatus for detecting and compensating for a backlight frame of claim 18, wherein the backlight compensating unit multiplies different weights according to the values of the first chrominance component or according to the values of the second chrominance component.

* * * * *